(12) United States Patent
Laddha et al.

(10) Patent No.: US 8,151,251 B2
(45) Date of Patent: Apr. 3, 2012

(54) E-PROFILER: DYNAMIC PROFILING AND AUDITING FRAMEWORK

(75) Inventors: Akhilesh Laddha, Bangalore (IN); Ritwik Batabyal, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 1342 days.

(21) Appl. No.: 11/755,773

(22) Filed: May 31, 2007

(65) Prior Publication Data
US 2008/0301170 A1 Dec. 4, 2008

(51) Int. Cl.
*G06F 9/45* (2006.01)
(52) U.S. Cl. .......................................... 717/135
(58) Field of Classification Search .................. 717/135
See application file for complete search history.

(56) References Cited

U.S. PATENT DOCUMENTS

| | | | |
|---|---|---|---|
| 6,757,720 B1 * | 6/2004 | Weschler, Jr. | 709/220 |
| 7,266,810 B2 * | 9/2007 | Karkare et al. | 717/130 |
| 7,293,259 B1 * | 11/2007 | Dmitriev | 717/130 |
| 2005/0240354 A1 * | 10/2005 | Mamou et al. | 702/19 |
| 2006/0143601 A1 * | 6/2006 | Concha et al. | 717/170 |
| 2007/0050604 A1 * | 3/2007 | Ferren et al. | 712/226 |

* cited by examiner

*Primary Examiner* — John Chavis
(74) *Attorney, Agent, or Firm* — Prakash Nama; Global IP Services, PLLC

(57) ABSTRACT

A method of dynamically generating profiling data using runtime non-intrusive profiling of application transactions which are contained in containers such as web servers, application servers, portal servers and J2EE/ECM containers, includes the following steps: using common resources of memory and environment for both profiling activity and application transactions; remotely executing project specific profiling administration and configuration; using the executed project specific profiling administration and configuration and completing remote profiling, and generating profiling data by taking assistance selectively from Aspect Oriented Programming, and Application Response Measurement; and, selectively using the profiling data to analyze performance bottlenecks and do auditing as needed by a user. The profiling is done by capturing metrics based on accepted standards, partially using the same memory as for the application transactions, without code-contamination in the containers and can be done layer-wise, tier-wise or at method level. A computer readable medium encoded with the method is included.

25 Claims, 3 Drawing Sheets

E-PROFILER: DYNAMIC PROFILING AND AUDITING FRAMEWORK

FIELD OF THE INVENTION

The present invention generally relates to an e-Profiler that can conduct profiling activity on application transactions, and more particularly to remote profiling activity of application transactions existing in containers such as web servers, application servers, portal servers and Enterprise Content Management (ECM) containers.

BACKGROUND OF THE INVENTION

It is known that profiling of application transactions located in several types of containers including web servers, application servers, portal servers and ECM containers such as Documentum, for example, can be done by spending significant amount of resources such as memory. The profiling activity is generally done independently of the execution of the application transactions, thus resulting in double consumption of resources separately for the profiling and the execution of the application transactions.

A brief description of the setting in which the present invention can be practiced is believed to be conducive to a better understanding of the context of the invention. Some of the terms used in the context of the present invention included ECM, Java®, JMX (Java Management Extensions), AOP (Aspect Oriented Programming) and ARM (Application Response Measurement).

ECM in one form includes any of the strategies and technologies employed in the information technology industry for managing the capture, storage, security, revision-control, retrieval, distribution, preservation and destruction of documents and content. ECM especially concerns content imported into or generated from within an organization in the course of its operation, and includes the control of access to this content from outside of the organization's processes.

ECM systems are designed to manage both structured and unstructured content, so that an organization, such as a business or governmental agency, can more effectively meet business goals (increase profit or improve the efficient use of budgets), serve its customers (as a competitive advantage, or to improve responsiveness), and protect itself (against non-compliance, law-suits, uncoordinated departments or turnover within the organization). In a large enterprise, ECM is not regarded as an optional expense where it is essential to content-preservation and re-usability and to the control of access to content, whereas, very small organizations may find their needs temporarily met by carefully managed shared folders, for example. Recent trends in business and government indicate that ECM is becoming a core investment for organizations of all sizes, more immediately tied to organizational goals than in the past, as well as increasingly more central to what an enterprise does, and how it accomplishes its mission.

Java Platform, Enterprise Edition (Java EE) is the industry standard for developing portable, robust, scalable and secure server-side Java applications. Building on the solid foundation of Java Se, Java EE provides web services, component model management, and communications APIs (Application Programming Interfaces) that make it the industry standard or preference for implementing enterprise class service-oriented architecture (SOA) and Web 2.0 applications.

In software engineering, the programming paradigms of AOP and Aspect Oriented Software Development (AOSD) attempt to aid programmers in the separation of concerns, specifically cross-cutting concerns, as an advance in modularization. AOP does so using primarily language changes, while AOSD uses a combination of language, environment, and method.

In computer science as known, crosscutting concerns are aspects of a program that affect (crosscut) other concerns. These concerns often cannot be cleanly decomposed from the rest of the system in both the design and implementation, and result in either scattering or tangling of the program or both.

Aspect-Oriented Programming (APO) complements Object Oriented (OO) programming by allowing the developer to dynamically modify the static OO model to create a system that can grow to meet new requirements. Just as objects in the real world can change their states during their lifecycles, an application can adopt new characteristics as it develops.

Aspect-oriented software development (AOSD) is a new approach to software development that addresses limitations inherent in other approaches, including object-oriented programming. AOSD aims to address crosscutting concerns by providing means for systematic identification, separation, representation and composition. Crosscutting concerns are encapsulated in separate modules, known as aspects, so that localization can be promoted.

AOP complements object-oriented programming by allowing the developer to dynamically modify the static object-oriented model to create a system that can grow to meet new requirements, allowing an application to adopt new characteristics as it develops. AOP provides a solution for abstracting cross-cutting code that spans object hierarchies without functional relevance to the code it spans.

In AOP, 'advice' is the code that is applied to, or cross-cuts, the existing object model.

AspectJ is one concept of AOP originated by the Xerox-PARC team which is used as the first and most popular AOP language. Most discussions of AOP use AspectJ, if only as a lingua franca for expressing crosscutting that is otherwise implemented.

Any AOP language has some crosscutting expressions that encapsulate the concern in one place. The difference between AOP languages lies in the power, safety, and usability of the approaches provided, e.g., interceptors that specify the methods to intercept and express a limited form of crosscutting, without much support for type-safety or debugging. AspectJ has a number of such expressions and encapsulates them in a special class, known as an 'aspect'. For example, an aspect can alter the behavior of the base code (the non-aspect part of a program) by applying advice (additional behavior) at various join points (points in a program) specified in a quantification or query called a pointcut (that detects whether a given join-point matches), an aspect that can also make binary-compatible structural changes to other classes, like adding members or parents Many AOP languages support method executions and field references as join points. In them the developer can write a pointcut to match, for example, all field-set operations on specific fields, and code to run when the field is actually set. Some also support aspects like defining a method in an aspect on another class. AOP languages can be compared based on the join points they expose, the language they use to specify the join points, the operations permitted at the join points, and the structural enhancements that can be expressed. AOP enables the developer to better separate tasks that should not be inextricably tangled, such as mathematical operations and exception-handling. The AOP approach has a number of benefits. First, it improves performance because the operations are more succinct. Second, it allows programmers to spend less time rewriting the same code. Overall, AOP enables better encapsulation of distinct procedures and promotes future interoperation. One fully featured AOP framework which is very useful to designers is Aspectwerkz, which as known is created by Jonas Boner and Alexndre Vasseur, Aspectwerkz, and is sufficiently versatile to be of great use to most developers in many situations.

Another concept that is relevant in the context of the present invention is "separation of concerns". Separation of concerns as understood herein entails breaking down a program into distinct parts that overlap in functionality as little as possible. All programming methodologies, including procedural programming and object-oriented programming, support some separation and encapsulation of concerns (or any area of interest or focus) into single entities. For example, procedures, packages, classes, and methods all help programmers encapsulate concerns into single entities. But some concerns defy these forms of encapsulation. Software engineers call these crosscutting concerns, because they cut across many modules in a program. Logging offers one example of a crosscutting concern, because a logging strategy necessarily affects every single logged part of the system. Logging thereby crosscuts all logged classes and methods.

Application Response Measurement (ARM) is an open standard which enables monitoring and diagnosing performance bottlenecks within complex enterprise applications that use loosely-coupled designs or service-oriented architectures. It includes an API for C and Java that allows timing information associated with each step in processing a transaction to be logged to a remote server for later analysis. As of 2006, version 4.0 is known as the latest version of the ARM standard.

The ARM version of API (Application Programming Interface) is understood as a set of standard API calls that enable measurement and the performance of applications. API is mainly used to measure response time, but can also be used to record application availability usage.

The term "Application" is generally understood as a program or group of programs designed for end users. Software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

There is generally need for developing a method for profiling and auditing applications without the excessive use of valuable resources to complete profiling activity.

SUMMARY OF THE INVENTION

The present e-Profiler serves the purpose of a standard compliance Performance Profiling and Auditing framework. The invention in one form provides an e-Profiler framework which profiles and audits application transactions without contaminating application code. It constructs and deploys profiling and auditing rules against each application tier (Web, Business and Data), locally and remotely to profile and audit application transactions. The present e-Profiler framework in one form has the ability to modify profiling and auditing rules at runtime and load time. It captures profiling parameters for applications, the parameters being without limitation and including: response time, CPU utilization, memory-usage, number of objects and threads creation. Auditing parameters might include: class name, method signature, parameter-type and parameter value. The present e-Profiler generates a data report in granular and customizable form including graphical formats or other desirable formats.

Profiling as an activity captures performance metrics for identified transactions at runtime and presents them in a meaningful manner to the users.

As part of this profiling activity, applications are executed at the same environment along with the profilers, thereby utilizing lot of machine memory partially used for executing the application in the enterprise container and partially for executing the Profiler itself. The project specific administration and configuration of the profilers are performed locally.

Three important areas can be identified from the above activities which may be improved upon, include:
   a. Capturing metrics based on accepted standards.
   b. Capturing metrics by cross-cutting application transactions using external agents—thereby reducing the transaction response times which normally is an overhead during profile based instrumentation
   c. Remotely executing project specific administration and configuration.

In a specific form, the present e-Profiler has been developed to profile and audit the applications on J2EE/ECM containers at runtime without contaminating its code. This solution is built using Aspect Oriented Programming, Application Response Measurement and Java Management Extension remotely to define cross-cutting concerns thereby addressing the above-stated concerns. Further,
   a. It helps consultants profile applications remotely
   b. It helps profile applications layer-wise/tier-wise or at method level thereby providing sufficient options to identify performance bottlenecks.
   c. It helps in non-intrusive profiling without participating or influencing the applications transactions As described herein, the present e-Profiler in one form facilitates to re-configure audit and profile rules for the application in running environments.

Functionally, the present e-Profiler in one form comprises a profiling and auditing framework which offers significant features that include:
   1) Load and runtime profiling
   2) Support for runtime modification of rules
   3) Provision of remote and local configuration of rules,
   4) Remote start and stop capability,
   5) No impact on performance and less memory footprint,
   6) Easily extended and customized for specific requirement,
   7) Application tier wise capturing metrics and generate report.

In one form, the invention resides in a method of generating profiling data from runtime remote profiling of application transactions which are contained in any of containers including web servers, application servers, portal servers and ECM (Enterprise Content Management) containers, comprising the steps of: using common resources of memory and environment for both profiling activity and application transactions; remotely executing project specific profiling administration and configuration; and, using project specific profiling administration and configuration, completing profiling of the application transactions remotely and generating profiling data by taking assistance selectively from AOP (Aspect Oriented Programming), and ARM (Application Response Measurement).

In a second form, the invention comprises method of dynamically and remotely profiling application transactions which may be contained in any of containers including web servers, application servers, portal servers and ECM (Enterprise Content Management) containers, comprising the steps of: identifying machine memory and environment which are used for executing said application transactions; selectively using the identified memory and environment for profiling activity; remotely executing project specific profiling administration and configuration; and, based on said profiling project specific profiling administration and configuration, completing profiling of the application transactions remotely and generating profile data in a non-intrusive manner by selectively using Aspect Oriented Programming (AOP) and Application Response Measurement (ARM) without hampering the application transactions.

The invention also includes a computer readable medium encoded with data/instruction which when executed by a computing platform results in execution of a method as recited above.

The generated profiling data is applied by the user to analyze performance bottlenecks and do auditing as needed or desired by the user.

DETAILED DESCRIPTION

Figure 1:
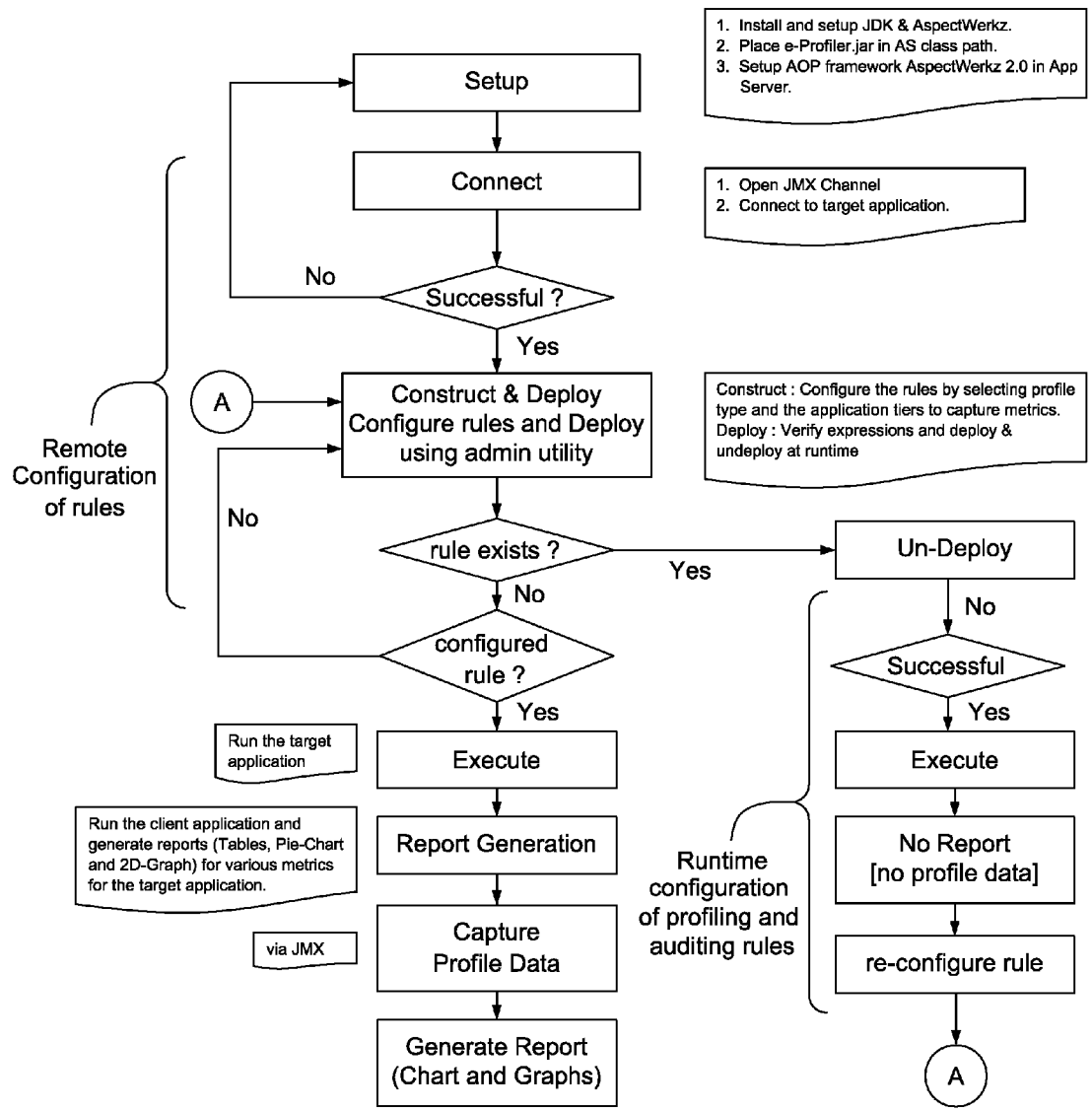
FIG. 1 shows an exemplary use and application of the e-Profiler in enterprise space-solution Architecture.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

In a broad form, the present e-Profiler is a compliance Performance Profiling and Auditing framework. The present e-Profiler profiles and audits application-transactions without contaminating the application code. It constructs and deploys profiling and auditing rules, against each application tier (Web, Business and Data), locally and remotely to profile and audit application. In one form, it modifies profiling and auditing rules at runtime and load time. It captures profiling parameters for applications, the parameters including: response time, CPU utilization, memory-usage, number of objects and threads created. Auditing parameters include: class name, method signature, parameter-type and parameter-value. Preferably, the present e-Profiler generates a data report in granular and customizable form including graphical formats.

In a preferred form as described herein, the present e-Profiler audits and profiles applications on J2EE containers like Web Servers, Application Servers and Portal Servers and ECM containers like Documentum.

In one form, the present e-Profiler audits and profiles application transaction without contaminating its code base. Rules for profiling and auditing are configured locally or remotely. Capture result is displayed locally or remotely in offline or online mode. This solution is built preferably selectively using Aspect Oriented Programming (AOP), Application Response Measurement (ARM) and Java Management Extension (JMX).

As described, e-Profiler uses AOP to crosscut application transaction at runtime to profile or audit transaction. AOP localizes concerns (Profiling and auditing rules), and spans parallel threads that read rules and asynchronously crosscut transaction at runtime. Consequently, there will not be much impact on transaction response time, and, it is easy to generate the required profile or audit-result without modifying code.

In a preferred form, the present e-Profiler uses JMX to configure profiling and auditing rules remotely and locally, and incorporate easy starts and stops. As described herein, e-Profiler uses ARM to measure transaction response time. It is open standard technology to measure response time. Using AOP and JMX at runtime the present e-Profiler imposes on application transactions to capture their response time.

With specific reference to FIG. 1, an exemplary version of the e-Profiler flow chart shows the steps followed in a sequence. The first step comprises set up and includes three sub-steps as follows: Install and set up Java Development Kit (JDK) and AspectWerkz; place e-Profiler.jar in AS (Application Server) class path; and setup AOP framework AspectWerkz 2.0 in application server. In the context of the present invention, an exemplary e-Profiler.jar includes the following implementations:

1) Aspect classes used to crosscut application transactions using AspectWerkZ,
2) JMX Agent and MBenas to configure profiling rules remotely and locally,
3) MBeans for report generation remotely and locally,
4) ARM specific call to capture metrics, and,
5) Remote auditing of specific implementation.

The second and third steps involve checking whether the connection is successful. For the second and third steps, the items to be completed include, opening the JMX channel and connecting to the target application. If the connection is not successful, the flow chart loops back to the first step. The fourth step in the flow chart is "construct and deploy". The 'construct' aspect of the fourth step requires configuring the rules by selecting profile type and the application tiers to capture metrics. The 'deploy' aspect of the fourth step consists in verifying expressions and deploying and un-deploying at run time. The fifth step in the flow chart consists in verifying if the deployment is successful, which if negative, will cause the fifth step to loop back to the fourth step. The sixth step relates to the process of executing the application where the target application is executed as a prelude to report generation.

The seventh step relates to report generation involving running the client application and generating reports in a desired format (e.g., tables, pie-charts, 2-D graphs) for various metrics for the target application. The step that follows is the eighth step for capturing profile data, for e.g., via JMX, to conclude in report generation as desired. The flow chart described above is for example only and it is noted that variations and use of different frameworks other than what the flow chart indicates are conceivable and are within the ambit of the invention.

Figure 2:
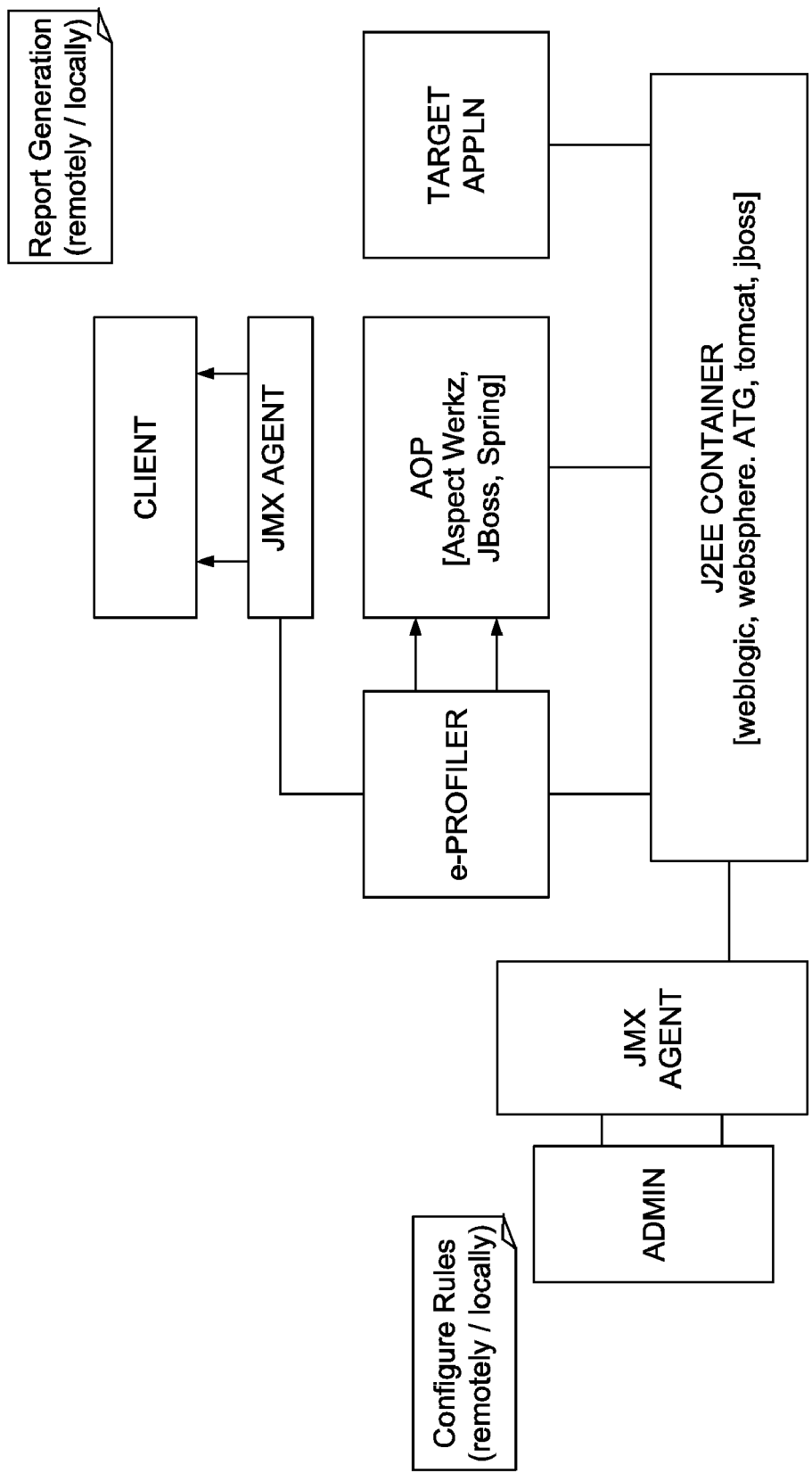
FIG. 2 illustrates a component diagram of an exemplary e-Profiler.

The following is a brief description of each component in the illustration of FIG. 2:

J2EE—Application Server where the target application is running.

AOP—AOP framework AspectWerkz is coupled with J2EE Container.

e-Profiler—e-Profiler engine jar will be set in the application server's classpath and will be running where the target application is hosted.

JMX Agent—java Management Extensions (JMX) agent is a management entity that runs in a Java Virtual Machine (JVM) and acts as the liaison between the MBeans and the management application.

Admin—e-Profile Admin utility is used to configure the rules (deploy/undeploy) for the target application which needs profiling.

Client—Swing based UI which generates the pictorial representation of the profiled/audited parameters. Data is displayed as a table, 2D-Graph and pie-chart.

Figure 3:
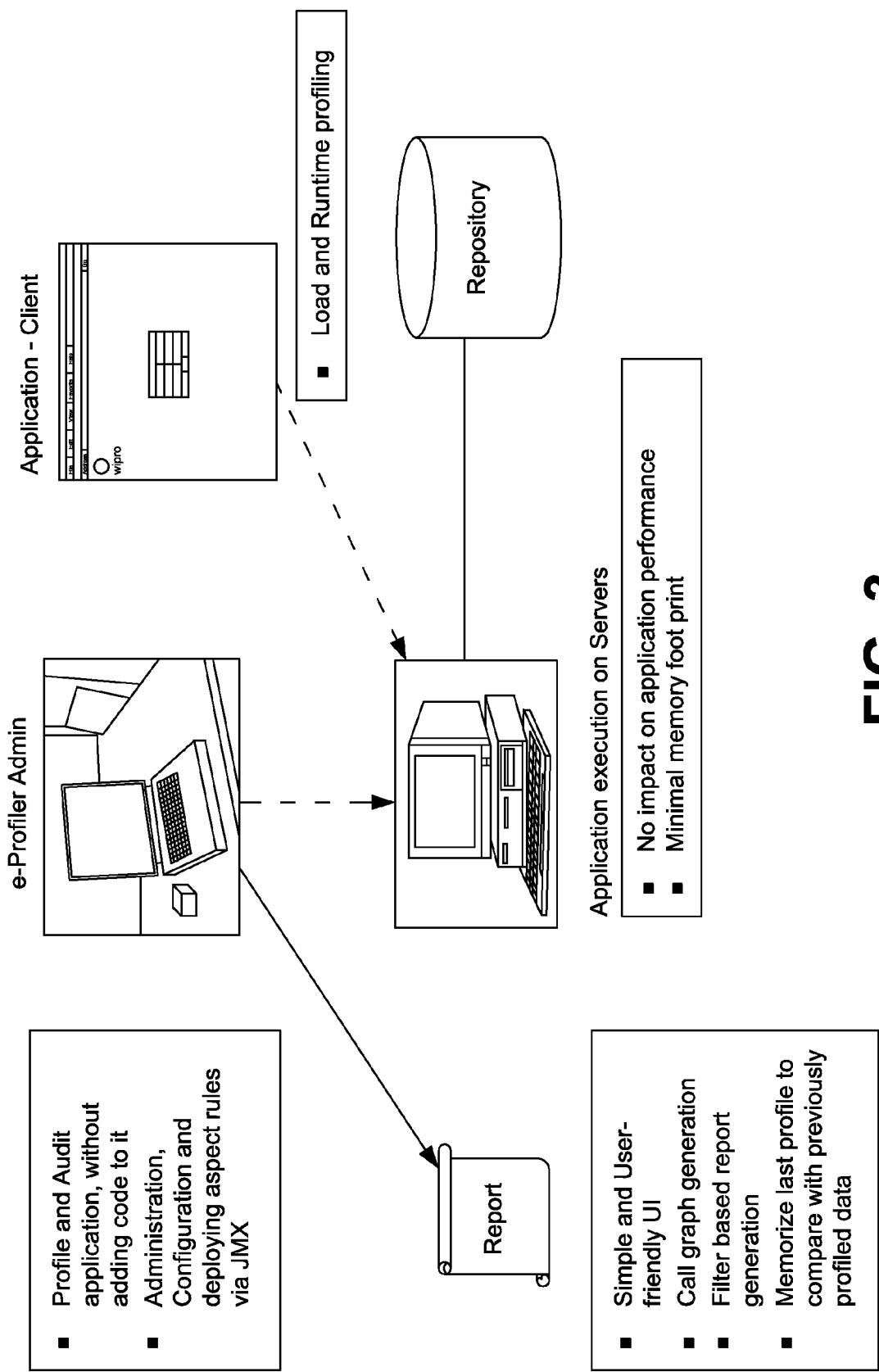
FIG. 3 illustrates showcase remote and dynamic (runtime) auditing and profiling capability in one exemplary embodiment of the invention.

Snippet of the FIG. 3 diagram is shown below:

Step 1: e-Profiler Admin will be run to configure (deploy/undeploy) the rules for the target application which needs profiling.

Step 2: Target application will be run (local or remote) to be profiled.

Step 3: Client application will be run to generate a graphical representation of the profiled/audited parameters of the target application.

Step 4: Generate the report (table 2D graph and pie-chart) and call-graph.

Use of the present e-Profiler framework on different platforms: The e-Profiler framework is preferably configured to be compliant with respective platforms to provide:
  a. relevant customizations done in reference class-paths of the server environment and,
  b. modification in steps of the process leading to the e-Profiler framework usage.
  From a technical standpoint, exemplary activity steps are captured below, without the need to modify e-profiler code-base, to work on different platforms such as BEA, IBM, JBOSS, etc., except suitably modifying the startup script of the relevant platform:
  1. Install JDK 1.5 and set JAVA_HOME
  2. Download AspectWerkz and extract to a directory.
  3. Set-up and configure AspectWerkz framework in Application Server and set required jars in classpath.
  4. Application Servers Supported are:
   a. Tomcat:
   i. Make an entry of AspectWerkz in startup script bin/catalina.bat.
   ii. Set CATALINA_HOME in classpath.
   b. Weblogic
   i. Modify the startup script.
   c. JBoss
   i. Make in entry of AspectWerkz in startup script JBOSS/bin/run.bat
   d. WebSphere
   i. Make an entry of AspectWerkz in startup script<<WebSphere Install Root>>\AppServer\bin\startServer.bat.
   ii. Does not use bootstrap startup class with WebSphere. May use late startup of e-Profiler engine due to some constraints
   e. ATG
   i. Make an entry of AspectWerkz in startup script \AppServer\bin\startDynamo.bat.
  5. Stop Application Server.
  6. Set e-Profiler.jar, arm-3.0.jar and servlet-api.jar in the Application Server Boot classpath.
  7. For windows copy the silib.dll to jre\bin directory.
  8. for Unix, copy the silib.so to jre\bin directory.
  9. Copy e-Profiler.war in application server:
   a. Tomcat: Copy e-Profiler.war file in webapps directory.
   b. Weblogic: Deploy the e-Profiler.war file using admin console.
   c. JBoss: Copy e-Profiler.war file in \server\default\deploy directory.
   d. WebSphere: Deploy the e-Profiler.war file using WebSphere admin.
  10. Start Application Server.
  11. The following message is obtained, if e-Profiler is initialized correctly.
  AspectWerkz—INFO—Pre-processor org.codehaus.aspectwerkz.transform.
  AspectWerkzPreProcessor loaded and initialized.
  Start e-ProfileEngine
  12. Go to Admin URL (e.g. http://localhost:portnumber/EProfile/Admin/) using the browser to run admin application. It is possible to deploy and undeploy rules.
  13. Run the target application which has to be profiled.
  14. Run the Client Utility to get a pictorial representation of the profiled/audited data. Data is displayed as follows:
  Tables.
  Pie-chart.
  2D Graph.

Some significant features of the present e-Profiler include:
Load and runtime profiling.
Support for runtime modification of rules.
Provision of remote and local configuration of rules.
Remote start and stop capability.
No impact on performance and less memory footprint.
Easily extended and customized for specific requirement, and,
Application tier wise capturing metrics and generate report.

Other advantages of the present e-Profiler include the following benefits on usage.
  i. Any application (J2EE/ECM) can be profiled and audited without modifying the application code base.
  ii. No impact on application transaction response time.
  iii. Provides remote/local application management ensuring very little memory footprint.
  iv. Provides load and runtime profiling.
  v. Can be easily extended and customized for specific requirements.
  vi. Remote configuration of profiling and auditing rules.
  vii. Runtime configuration of profiling and auditing rules, and,
  viii. Dynamic (runtime) weaving supports.

The e-Profiler Framework has been successfully used for implementation on the following platforms:
BEA
  a. Weblogic Application Server
IBM
  b. Websphere Application Server
JBoss Application Server
ATG
  c. Commerce Server
  d. Application Server
ECM
  e. Documentum The present invention includes a computer readable medium encoded with software data/instruction which when executed by a computing platform would result in execution of a method as described and claimed herein. Different embodiments of the present subject matter can be implemented in software which can be used in any suitable computing environment. The embodiments of the present subject matter are also operable in a number of general-purpose or special-purpose computing environments, or processors or processing units. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as referred to hereinabove, includes any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" if used are plain-English equivalents of the respective terms "comprising" and "wherein," respectively. Moreover, the terms "first," "second," and "third," etc., if used, are merely labels, and are not intended to impose numerical requirements on their objects.

The invention claimed is:

1. A method of generating profiling data from runtime remote profiling of application transactions which are contained in any of containers including web servers, application servers, portal servers and ECM (Enterprise Content Management) containers, comprising the steps of:
using common resources of memory and environment for both profiling activity and application transactions;
remotely executing project specific profiling administration and configuration; and,
using said project specific profiling administration and configuration, completing profiling of said application transactions remotely and generating profiling data by taking assistance selectively from AOP (Aspect Oriented Programming), and ARM (Application Response Measurement).

2. The method as in claim 1, wherein said ECM containers include Documentum, and wherein the stop of taking assistance includes using other available commercial software management information.

3. The method as in claim 1, including a user performing configuration of profiles and project specific administration locally, and assisting said profiling selectively from methods including layer-wise profiling, tier-wise profiling, and method level profiling.

4. The method as in claim 1, wherein said containers may be J2EE containers.

5. The method as in claim 1, including the step of measuring transaction response time by using said ARM.

6. The method as in claim 1, including the step of generating a profile report and auditing as needed.

7. The method as in claim 6, including using AOP to cross-cut application transaction run time, thereby facilitating profiling and auditing.

8. The method as in claim 7, including the step of said AOP localizing profiling/auditing rules and related concerns.

9. The method as in claim 8, including the step of spanning a parallel thread that reads rules and asynchronously cross cuts transaction at run time.

10. The method as in claim 1 including the step of identifying performance bottlenecks from said profiling data.

11. A method of dynamically remotely profiling application transactions which may be contained in any of containers including web servers, application servers, portal servers and ECM (Enterprise Content Management) containers, comprising the steps of:
identifying machine memory and environment which are used for executing said application transactions;
selectively using said identified memory and environment for profiling activity;
remotely executing project specific profiling administration and configuration; and,
based on said profiling project specific profiling administration and configuration, completing profiling of said application transactions remotely and generating profile data in a non-intrusive manner by taking assistance from Aspect Oriented Programming (AOP) and Application Response Measurement (ARM) without hampering the application transactions.

12. The method as in claim 11, wherein said ECM containers include Documentum, and wherein the step of taking assistance includes using other available commercial software management information.

13. The method as in claim 11, including a user performing configuration of profiles and project specific administration locally, and assisting said profiling selectively from methods including layer-wise profiling, tier-wise profiling, and method level profiling.

14. The method as in claim 11, wherein said containers may be J2EE containers.

15. The method as in claim 11, including the step of measuring transaction response time by using said ARM.

16. The method as in claim 11, including the step of generating a profile report and auditing as needed.

17. The method as in claim 16, including using AOP to cross-cut application transaction run time, thereby facilitating profiling of said application transactions and further auditing.

18. The method as in claim 17, including the step of said AOP localizing profiling/auditing rules and related concerns.

19. The method as in claim 18, including the step of spanning a parallel thread that reads rules and asynchronously cross cuts transactions at run time.

20. The method as in claim 11 including the step of identifying performance bottlenecks from said profiling data.

21. A method of dynamically generating profiling data from run time remote non-intrusive profiling of application transactions which are contained in any of containers including web servers, application servers, portal servers and ECM (Enterprise Content Management) containers, comprising the steps of:
   using common resources of memory and environment for both profiling activity and application transactions;
   remotely executing project specific profiling administration and configuration;
   using said project specific profiling administration and configuration, completing profiling of said application transactions remotely and generating profiling data by taking assistance selectively from AOP (Aspect Oriented Programming), and ARM (Application Response Measurement) and,
   selectively using said profiling data to analyze performance bottlenecks and do auditing as needed by a user.

22. The method as in claim 21, including the step of generating a pictorial representation of the profiling data in any of forms chosen from table, 2D graph and a pie chart, with help from a user interface, for assisting in auditing.

23. A computer readable medium encoded with data/instruction which when executed by a computing platform results in execution of a method as in claim 1.

24. A computer readable medium encoded with data/instruction which when executed by a computing platform results in execution of a method as in claim 11.

25. A computer readable medium encoded with data/instruction which when executed by a computing platform results in execution of a method as in claim 21.

* * * * *